Dec. 10, 1929.            S. I. PETERS            1,739,016
                        ANTISKID CHAIN
                       Filed July 6, 1928

Inventor

Samuel I. Peters

By Clarence A. O'Brien
                                 Attorney

Patented Dec. 10, 1929

1,739,016

UNITED STATES PATENT OFFICE

SAMUEL IVAN PETERS, OF TUCSON, ARIZONA

ANTISKID CHAIN

Application filed July 6, 1928. Serial No. 290,745.

The present invention relates to improvements in anti-skid chains for automobile tires, and has for its principal object to provide a structure which will prevent circumferential and lateral skidding of the wheels of a vehicle when travelling over a wet or slippery surface.

One of the important objects of the present invention is to provide an anti-skid chain which includes a novel means for securing the ends of the side or circumferential chains together in a quick and efficient manner, and further in such a way as to prevent the ends of the side chains becoming disconnected during the use of the chains on a vehicle wheel.

Still a further object is to provide an antiskid chain of the above mentioned character which includes diagonally disposed cross chains, the hooks associated with the respective ends of each cross chain being adapted to embrace both of the sides of the adjacent links in the side chains, thereby strengthening the connection between the cross chains and the side chains and prolonging the durability of the anti-skid chains.

A further object is to provide an anti-skid chain of the above mentioned character which is simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and wherein like reference characters designate like parts throughout the several views.

Figures 1, 2, 3:
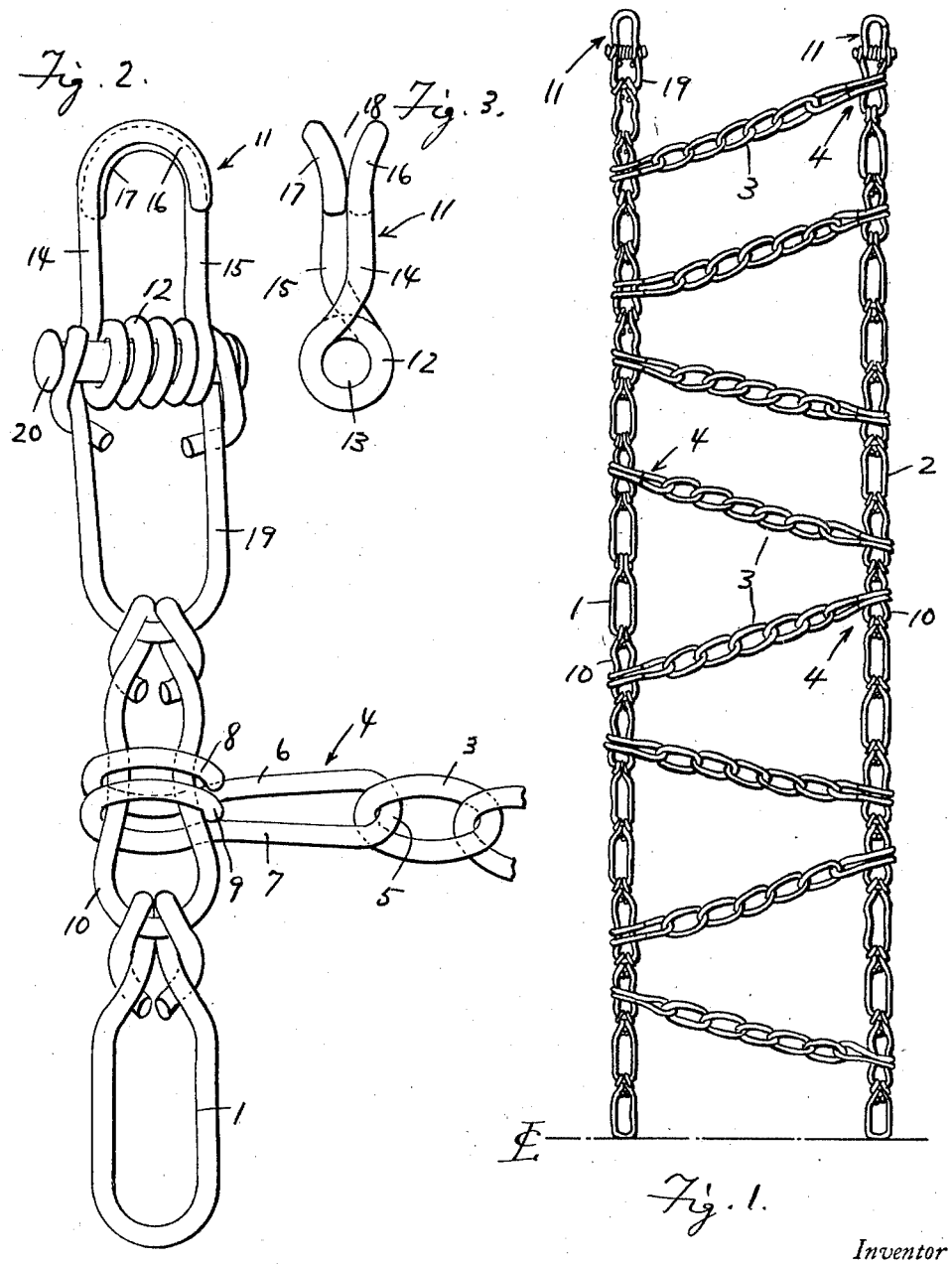
Figure 1 is a top plan view of one end portion of the anti-skid chain embodying my invention.
Figure 2 is an enlarged detail showing one of the ends of one side chain, showing my improved fastening device associated therewith, and also illustrating the manner in which one end of one cross chain is connected to the adjacent link of said side chain.
Figure 3 is an edge elevation of the fastening device forming a salient part of the present invention.

In the drawing, wherein for the purpose of illustration is shown the preferred embodiment of my invention, the numerals 1 and 2 designate a pair of side chains that are adapted to extend circumferentially around the sides of a tire mounted upon a vehicle wheel in the manner well known in the art. Each of the side chains includes a plurality of interconnected links. The circumferentially extending side chains are connected together by the cross chains 3 that extend across the tread portion of the tire.

Each of the cross chains includes a plurality of interconnected links and attached to the respective ends of each cross chain are the hooks 4, that are adapted to engage with certain of the links of the respective side chains 1 and 2.

As clearly illustrated in Figure 1 of the drawings, the cross chains are disposed diagonally between the circumferentially extending side chains and the purpose of arranging the cross chains in a diagonal manner is to prevent lateral skidding and to further increase the traction of the vehicle wheel over a slippery or wet surface.

Each of the hooks 4 consists of a single strand of wire bent back upon itself, intermediate its ends to provide the bight portion 5 and the spaced arms 6 and 7 respectively. The bight portion 5 engages with the respective end link of each cross chain while the free ends of the arms 6 and 7 are bent back upon themselves to form a pair of aligned hook forming loops 8 and 9 respectively that embrace the sides of certain of the links of each side chain and each of the links on the side chains that is embraced by the hook 4 of the adjacent cross chain has its sides slightly bent inwardly at the intermediate portion thereof as clearly shown in Figure 2, thereby providing a loose connection between the looped portions 8 and 9 and the adjacent link 10.

By embracing both sides of certain of the links of the side chains in the manner as suggested in Figures 1 and 2, a stronger connection between the cross chains and the parallel side chains is provided, thereby prolonging the durability of the anti-skid chain, and furthermore there will be no possibility of the hooks 4 becoming disengaged from the adjacent links of the side chains as frequently occurs with the type of connection now employed for securing the cross chains of antiskid chains to the parallel side chains.

The invention further comprehends the provision of a novel means for securing the free ends of each side chain together and the specific construction of the fastening means will now be described.

The chain fastener is denoted generally by the reference character 11 and the same is formed from a single piece of spring wire that is formed at its intermediate portion with the transversely disposed convolutions 12 to form a pivot pin receiving bore 13. The free ends of the wire extend outwardly from the respective ends of the coiled portion to form the parallel spaced arm portions 14 and 15 respectively and the free ends of these arms are curved to form the oppositely disposed hooks or bills 16 and 17 respectively.

As clearly shown in Figure 2, the hooks or bills are disposed in overlapping relation and due to the resiliency of the material from which the fastener 11 is constructed, the hooks or bills will have a tendency to be normally disposed in abutting engagement with each other. As more clearly disclosed in Figure 3, the crown portions of the over lapping bills or hooks are flared outwardly with respect to each other, whereby to provide a mouth 18 to facilitate the insertion of the free end of the other end of the side chain to be inserted between the hooks or bills and to finally become connected with the links forming fastener 11 as is obvious from the construction disclosed.

It is of course to be understood that in attaching the fastening links 11, to one end of each side chain, said end of each side chain has its links separated to form a substantially U-shaped member 19, the free ends of the arms being disposed around the pivot forming headed pin 20 that extends through the aligned convolutions 12. These convolutions afford spring means to normally maintain the hooks or bills 16 and 17 in a closed position, so that the ends of each side chain when connected together by the fastener 11 will not be accidentally disengaged at any time, during the use of the anti-skid chain upon a vehicle wheel.

It will thus be seen from the foregoing description that I have provided an anti-skid chain that can be readily and easily attached on a vehicle wheel and when the parts are secured, there will be no possibility of the chain becoming disengaged from the wheel even during the backing up of the vehicle.

An anti-skid chain constructed in accordance with the present invention will be strong and durable and yet very inexpensive in its manufacture.

While I have shown the preferred embodiment of my invention, it is to be understood that various changes in the size, shape and arrangement of parts may be resorted to, without departing from the spirit of the invention or the scope of the appended claim.

What is claimed is:

A chain fastener of the class described comprising a snap hook formed from a single length of spring wire having its intermediate portion coiled and with its ends extended parallel from opposite ends of the coiled portions and terminating in opposed hooks, cooperating to form a loop with the hooks yieldably retained in closed overlapping relation by the coil, a pin extended through the coil having heads at each end, and a link formed of a single length of wire having its intermediate portions formed into a loop and having its ends secured to opposite ends of said pin outwardly of the ends of said coiled portion.

In testimony whereof I affix my signature.

SAMUEL IVAN PETERS.